(12) United States Patent
Wilkins et al.

(10) Patent No.: US 9,322,630 B2
(45) Date of Patent: Apr. 26, 2016

(54) METHOD FOR PRODUCING AND CHECKING AN INTERNAL THREAD

(71) Applicants: Peter Wilkins, Grays (GB); Amando Jose Jose Sebastian, Novi, MI (US); Timothy M. Hull, Grass Lake, MI (US); Juergen Bleyer, Bedburg (DE); Reece Adams, Bridgend (GB); Francis Maslar, Grosse Ile, MI (US); Mike O. Thompson, Maldon (GB); Alexander M. Stoll, Bergisch Gladbach (DE)

(72) Inventors: Peter Wilkins, Grays (GB); Amando Jose Jose Sebastian, Novi, MI (US); Timothy M. Hull, Grass Lake, MI (US); Juergen Bleyer, Bedburg (DE); Reece Adams, Bridgend (GB); Francis Maslar, Grosse Ile, MI (US); Mike O. Thompson, Maldon (GB); Alexander M. Stoll, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 14/061,374

(22) Filed: Oct. 23, 2013

(65) Prior Publication Data
US 2014/0112729 A1  Apr. 24, 2014

(30) Foreign Application Priority Data
Oct. 24, 2012  (DE) .......................... 10 2012 219 380

(51) Int. Cl.
*B23G 1/34* (2006.01)
*G01B 5/16* (2006.01)
*B23G 1/32* (2006.01)
*F02F 1/24* (2006.01)

(52) U.S. Cl.
CPC  *G01B 5/163* (2013.01); *B23G 1/32* (2013.01); *B23G 1/34* (2013.01); *F02F 1/242* (2013.01); *Y10T 409/300112* (2015.01)

(58) Field of Classification Search
CPC ............ G01B 5/163; B23G 1/32; B23G 1/34; B23G 2240/56; H01T 13/08
USPC ................................... 33/613, 645
See application file for complete search history.

(56) References Cited

U.S. PATENT DOCUMENTS 8,104,445 B2  1/2012  Seeger
8,407,891 B2  4/2013  Owusu et al.

FOREIGN PATENT DOCUMENTS

| EP | 1508947 | 2/2005 |
| JP | 2002/141156 | 5/2002 |
| WO | 2011/043053 | 4/2011 |

*Primary Examiner* — Sunil K Singh
*Assistant Examiner* — Alan Snyder
(74) *Attorney, Agent, or Firm* — Diederiks & Whitelaw, PLC

(57) ABSTRACT

The invention relates to a method for producing and checking a thread arranged in a cylinder head to receive a spark plug. However, the invention also relates to a device for checking the thread introduced into the cylinder head.

By defining a starting point of the internal thread to be produced specifically in terms of position thereof within the parent hole by using spark plug parameters, the spark plug will always be aligned with its spark gap oriented toward the injector. For the purpose of checking, use is made of a plug gage, the screw-in thread of which has the parameters of the spark plug thread and with which, by using a measuring face, the position of an extension on the threaded body can be established. The extension simulates the ground electrode of the spark plug.

6 Claims, 2 Drawing Sheets

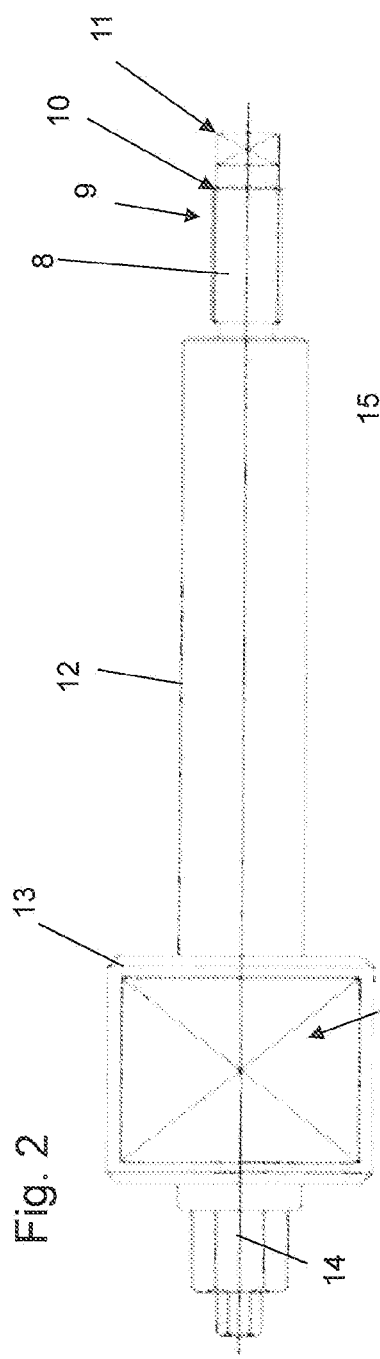
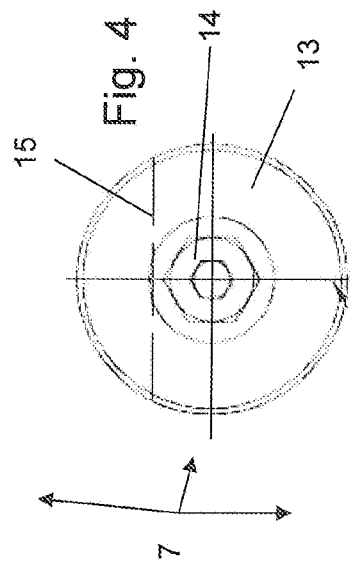
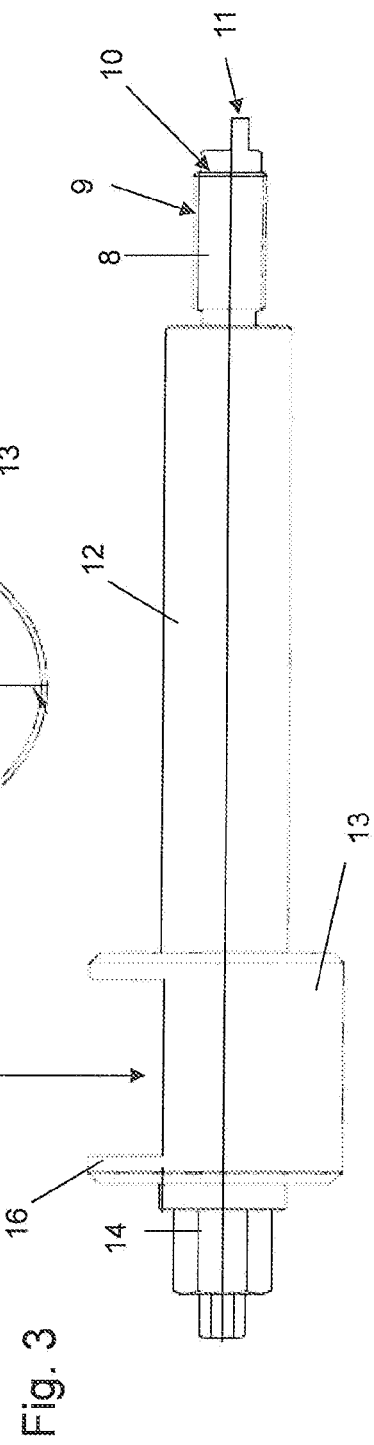

METHOD FOR PRODUCING AND CHECKING AN INTERNAL THREAD

BACKGROUND OF THE INVENTION

The present invention relates to a method for producing and checking a thread arranged in a cylinder head to receive a spark plug. However, the invention also relates to a device for checking the thread introduced into the cylinder head.

In an ideally operating internal combustion engine, combustion gas, i.e. the fuel-air mixture, is ignited by the spark plug. Conventional spark plugs have a central electrode and a ground electrode; the ground electrode can also be designated as a roof electrode. The latter has a vertical web extending substantially parallel to the central electrode, from which an ignition surface is bent over in the direction of the central electrode as a transverse web. The transverse web has the free front edge. The ignition surface is spaced apart axially with respect to an ignition end of the central electrode, so that a spark gap is formed, in which an ignition spark is generated by means of known means and coordinated with the injection time. It is thus possible for the combustion gas to be ignited, this being generally known.

The combustion gas, i.e. the fuel-air mixture, must have in this case a suitable mixture ratio in order to be able to ensure proper ignition and thus a desired combustion. As a result of tolerances and cycle (work cycle) to cycle (work cycle) deviations, the combustion gas can deviate from this optimal mixture ratio, which results in more or less stable ignition and/or combustion conditions. Here, in particular the volume located between the roof electrode and the central electrode at the ignition time is critical. If, during the period of ignition, there is no optimally ignitable mixture in the area of the spark gap, this can lead to a slow or incomplete combustion process, in the worst case even to a complete misfire.

Usually, the injector is set with its injection angle relative to the spark gap between the roof electrode and the central electrode such that the desired optimal, substantially lean fuel gas mixture can be ignited. For example, the fuel jet injected could deviate from its set injection angle, so that there is a too rich or too lean, non-optimally ignitable fuel gas mixture in the area of the spark gap between the roof electrode and the central electrode.

If a conventional spark plug is screwed into the cylinder head, the rotational orientation, in particular of the roof electrode and therefore the position of the spark gap, is absolutely random, which is of no further importance for internal combustion engines with homogeneous combustion. However, in internal combustion engines with direct injection, this means that the combustion process can vary, since the roof electrode almost conceals the spark gap in relation to the injector, so to speak, so that the actually achievable combustion quality is not present. This is also because the fuel does not evaporate during the direct injection but, following a rectilinear flight path, reaches the spark plug in droplet form, the spark gap thereof being concealed by the electrode. To this extent, as already mentioned above, misfiring, increased fuel consumption and reduced effectiveness with associated increased environmental pollution are to be expected if the fuel jet injected does not reach the area of the spark gap between the roof electrode and the central electorate as envisaged, so that even measures for adjusting the injection angle of the fuel jet are ineffective.

From this starting point, attempts are known to align the spark plug with its roof electrode oriented toward the fuel injector, so that the fuel jet injected can reach the spark gap unimpeded (oriented spark plug).

DE 10 2007 024 878 A1 proposes a spark plug, the spark plug body of which has a rotary code, the external thread being formed on a nut that can be rotated around the spark plug body. The mount for the spark plug has a rotary code that is complementary thereto. Thus, the spark plug might be able to be inserted only in a single orientation predefined by the complementary rotary code. Fixing is carried out by means of the nut without rotating the spark plug body.

EP 1 508 947 B1 likewise deals with measures for aligning the roof electrode, i.e. the spark gap, toward the injector. The spark plug has a deformable sealing and compensating element, which is arranged in such a way that the sealing and compensating element is loaded with a tightening torque as the spark plug body is screwed in, the sealing and compensating element being formed with such a geometry and from such a material that the sealing and compensating element is loaded up to its elastic limit when a predetermined tightening torque is applied and, as the spark plug is rotated further, the material thereof begins to flow above the yield point. A hexagon is formed on the spark plug body in such a way that the ground electrode has an accurate, determined and detectable position in relation to the mounting tool when the mounting tool for the spark plug is placed on the hexagon. The intention is to ensure that rotation beyond the prescribed tightening torque is possible, it being possible for the central electrode to be brought into the desired position via this additional rotation. In order to be able to determine the position of the ground electrode reliably, EP 1 508 947 B1 proposes the arrangement of a bi-hex structure, which can be assigned to the position of the ground electrode, on an outer surface of the hexagon, the central axis of the bi-hex structure being congruent with the central axis of the roof electrode, and the tip of the bi-hex structure equally being oriented with the extent of the roof electrode toward the central electrode.

SUMMARY OF THE INVENTION

Against this background, the object of the present invention is to specify a method for producing an internal thread with which a conventional spark plug can be mounted with conventional means in the cylinder head thread, which is produced, such that the roof electrode, i.e. the spark gap, is aligned reliably and always with the same orientation as the fuel injector. The invention is also based on the object of specifying a device with which the cylinder head thread produced can be checked extremely simply to see whether the roof electrode, i.e. the spark gap, is aligned oriented toward the injector when the spark plug is mounted.

This object is achieved by a method having the features of the claims.

It should be pointed out that the features listed individually in the following description can be combined with one another in any desired, technically practical way and indicate further refinements of the invention. The description additionally characterizes and specifies the invention, in particular in conjunction with the figures.

According to the invention, a method for producing and checking a thread arranged in a cylinder head to receive a spark plug comprises at least the following steps:
determining the spark plug parameters,
introducing a spark plug hole into the cylinder head,
defining a starting point of an internal thread to be introduced into the spark plug hole and corresponding with the spark plug thread, by using the spark plug parameters determined,
introducing the internal thread by a milling tool being brought up to the wall of the hole in a grazing manner, that is to say tangentially, at least in the area of the starting point determined, the internal thread being milled circularly, and introducing a plug gage which has the parameters of the spark plug into the internal thread created, the plug gage having a spanner flat for the action of a torque wrench and a measuring face which is provided opposite an extension arranged on a thread section corresponding to the spark plug thread, wherein the extension is aligned so as to correspond with an orientation of the roof electrode spark plug, wherein the orientation of the extension in the mounted state can be recorded by means of the measuring face.

The starting point of the invention is that a spark plug to be introduced into a cylinder head is produced as a mass product, and spark plugs from the same series also have coincident parameters. To this extent, by using the invention a conventional spark plug can be used in the internal combustion engine, it being possible to dispense with any special spark plug configuration deviating from the mass production. At the same time, it is thus possible to fall back on a conventional insertion tool. Spark plug parameters can be, for example, the axial extent of the spark plug thread and also further thread parameters (e.g. dimension, flank, pitch, z dimension), wherein the spark plug has to be screwed into the corresponding internal thread with a predefined tightening moment (torque). Since the starting point is defined in advance using the spark plug parameters and is not arranged randomly at any location within the hole, after the final tightening with the predefined torque, the spark plug, i.e. the spark gap, is aligned correctly, that is to say aligned with respect to the injector, such that the spark gap is not concealed.

Provision is expediently made for the internal thread to be milled circularly into the parent hole, wherein, by using the thread milling cutter, a movement is made on a circle along the wall of the hole and at the same time an advance along the axis of the hole. The thread milling cutter is somewhat smaller than the parent hole and simultaneously rotates about itself, wherein the milling tool is moved up to the starting point from a central position in a grazing manner, that is to say tangentially, and, following the creation of the internal thread, is moved back out of the central position in a grazing manner, that is to say runs out tangentially and moves out in the direction of the central position.

It is important that the starting point at which the circular movement of the milling tool begins in the internal diameter of the pilot hole is defined in advance. With knowledge of the starting point, a defined thread is milled into the cylinder head, that is to say into the pilot hole, such that the roof electrode is always aligned with the same orientation toward the injector, concealment of the spark gap by the roof electrode being largely ruled out if the spark plug is screwed in with the predefined torque. Of course, in a series of internal combustion engines, the corresponding series spark plugs should also be used. Different engine series are provided with series spark plugs matched to this engine series. Expediently, the matched internal thread can be produced for each spark plug series by using the invention, so that each spark plug of the spark plug series can be arranged in the respective internal combustion engine so as to be aligned with the same orientation toward the injector.

Of course, it is possible for the milling tool to begin milling the thread in a tolerance band around the starting point. The tolerance band can be, for example, ±30°. Likewise, it would be possible to produce a thread in which the spark plug with its spark gap would nevertheless be oriented beneficially toward the injector. Of course, the aforesaid tolerance band is to be understood merely by way of example, other tolerance amounts, in particular smaller but also larger, also being conceivable.

It is also expedient if the internal thread to be produced is produced with respect to the screwing-in conditions, consideration being given in particular to screwing in with lubricants (oils, greases). In the lubricated state, the angle of rotation increases with increasing torque, the angle of rotation decreasing with increasing torque under dry conditions.

It is possible to introduce the hole into the cylinder head first, for which purpose a simple drilling tool can be used. The internal thread can then be introduced with the milling tool. Here, the hole can be introduced from one side of the cylinder head and the internal thread from the opposite side thereto. It is also possible to introduce both the hole and the internal thread from the same side. Of course, a combination tool can also be used, which combines a drill and a milling tool, so that a drilling thread milling cutter would be formed.

Once the internal thread has been produced with the necessary parameters corresponding to the spark plug thread, the plug gage is screwed into the internal thread. The plug gage advantageously has a threaded body with an external thread which, in a corresponding way, has the parameters of the relevant spark plug. To this extent, the plug gage can, so to speak, simulate the spark plug. Of course, the plug gage must be produced in particular with its external thread matching the series spark plug for which the internal thread is or has been produced.

The plug gage therefore has a threaded body having a screw-in thread on which the extension is arranged on one side thereof, which can be designated as the screw-in side. At the end of the screw-in thread opposite to the extension, a central section is formed, which merges into a measuring section. Arranged on the measuring section is a hexagon having the spanner flat. The central section is preferably formed cylindrically and has a diameter which is smaller than the diameter of the measuring section. The measuring section is preferably formed cylindrically and has the measuring face, which is incorporated into the measuring section as a flat surface in the manner of a circular section. The measuring face is delimited by material lands that have remained standing. The measuring face is arranged in a predefined position with respect to the extension such that, with the recording of the angular position of the measuring face, when the plug gage is screwed in the position of the extension with respect to the injector can be determined. Since the extension simulates the spark plug electrode, it is thus possible to draw conclusions about the position of the same in the combustion chamber. The plug gage is screwed in by means of action on the hexagon, it being possible for the tightening moment correlating with the spark plug torque to be applied by means of a torque wrench.

The plug gage can be screwed manually or automatically into the internal thread produced in accordance with the method of the invention, defined tightening being achieved manually or automatically via the torque wrench.

In order to determine the position of the extension within the cylinder head, i.e. in order to determine the position of the spark plug electrode in the combustion chamber relative to the injector, a measuring instrument, for example an angle measuring instrument, preferably a digital angle measuring instrument, can now be placed on the flat measuring face. At the sides, the measuring instrument is held by the material lugs that have remained standing. By using the angular position, the position of the extension within the combustion chamber can be determined directly, which means that it is possible to draw conclusions about the orientation of the spark gap of the spark plug to be screwed in later. Instead of or in addition to the manual recording of the measuring face position, sensing the measuring face by means of a sensing finger of a coordinate measuring device is also possible.

By using the plug gage, in the sense of the invention, the internal thread introduced into the cylinder head to receive the spark plug to be screwed in can therefore be checked to see whether the spark plug is aligned in the desired position toward the injector. Such a check can be carried out following each tool change and/or following a predefined number of internal threads produced. For instance, a number of 100 holes or internal threads produced can be predefined, without this being intended to be restrictive. If a deviation of the recorded actual values from the reference data were to be determined, a correction to the starting point of the internal thread to be introduced can thus be carried out. However, if the deviation lies within the above-described tolerance band, it is possible to dispense with a correction of the starting point, since the tolerance band is preferably chosen such that the spark gap is oriented relative to the injector so as not to be concealed.

BRIEF DESCRIPTION OF THE DRAWINGS

Further advantageous details and effects of the invention are explained in more detail below by using exemplary embodiments illustrated in the figures, in which:

FIG. 2 shows a device for checking the radial orientation of the internal thread in a plan view, FIG. 3 shows the device from FIG. 2 in a side view, and FIG. 4 shows the device from FIG. 2 in a front view.

DETAILED DESCRIPTION OF THE PREFERRED EMBODIMENTS

Figure 1:
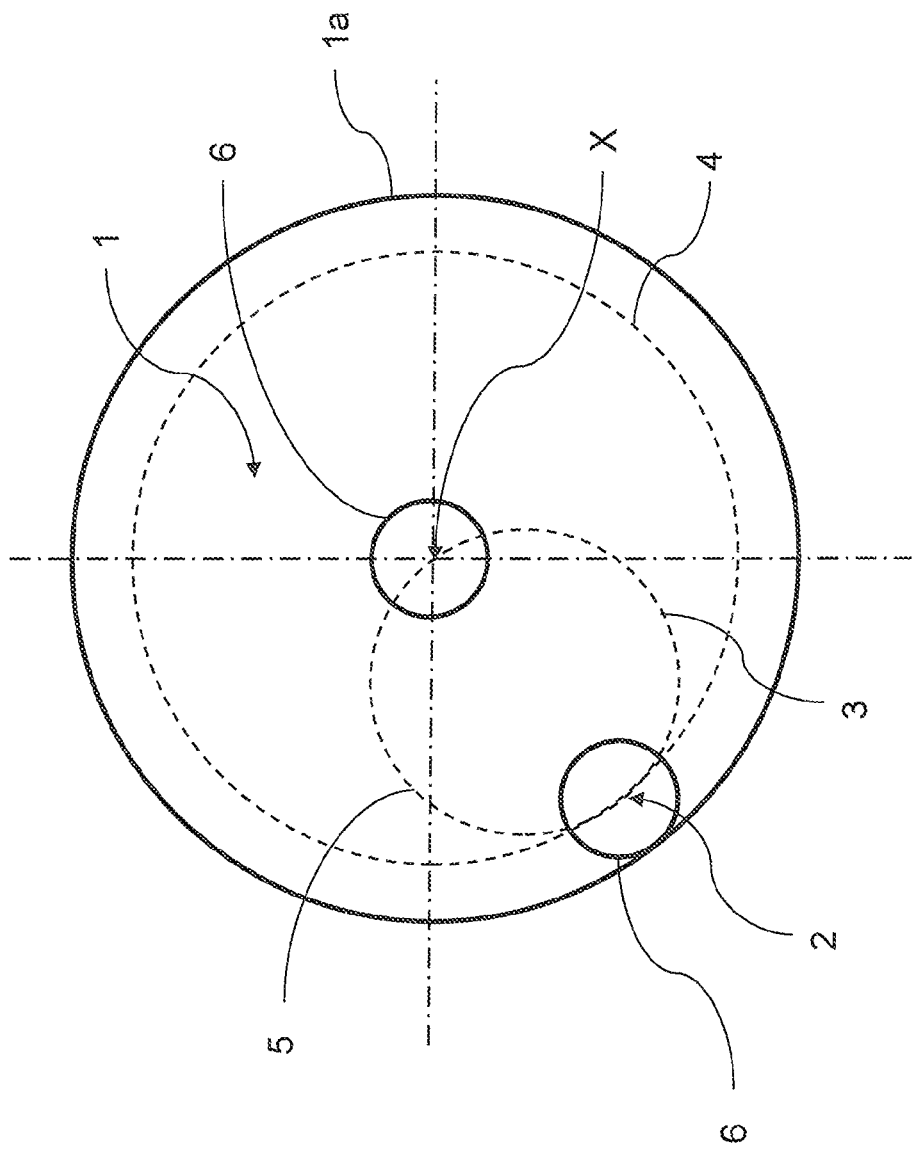
FIG. 1 shows a basic sketch relating to the introduction of an internal thread into a parent hole.

In the different figures, identical parts are always provided with the same designations, so that these are generally also only described once.

FIG. 1 shows a method for producing an internal thread in a parent hole, for example FIG. 1 shows in principle a method for producing an internal thread in a cylinder head hole in order to screw in a spark plug. FIG. 1 is not to scale.

The hole 1 is introduced into a cylinder head, not illustrated further, by using a drill. The intention is to produce a thread in the hole 1 in order to screw in a series spark plug which has an external thread on a screw-in body. The parameters of the external thread of the spark plug, but also the predefined tightening moment, are recorded. By using the spark plug parameters, a starting point 2 of the thread to be produced can be fixed in a defined manner at a specific location on the parent hole wall 1a, so that the spark plug, when installed, is aligned with its spark gap oriented toward an injector opening in the combustion chamber of the cylinder head.

In order to produce the internal thread, use can be made of a thread milling cutter 6, which is smaller in diameter than the diameter of the parent hole.

Once the starting point 2 has been defined, the thread milling cutter 6 moves to the latter out of a central position X in a grazing manner, i.e. tangentially with respect thereto, which is indicated by the circular path 3 in FIG. 1. In the process, the thread milling cutter 6 does not move linearly, i.e. radially, from its central position X to the starting point 2 but following a circular path 3. Subsequently the thread milling cutter 6, following a circular path 4 in the pilot hole, is guided along the wall 1a of the hole, always at a constant distance from the latter, the thread milling cutter 6 undergoing a forward thrust in the direction of the hole and the circular path 4. The two movements are superimposed. In addition, the thread milling cutter 6 rotates about its own central axis, so that the thread milling cutter 6 executes two rotational movements, namely the rotational movement along the wall 1a of the hole and the rotational movement about its central axis. Once the thread milling cutter 6 has traveled long the whole of its circular path 4, said cutter is removed from the wall of the hole at the starting point 2 and transferred back into its central position X, which is done as before during the grazing, i.e. tangential approach likewise grazing, therefore tangentially, following a circular path 5. The starting point 2 can be arranged within a specific tolerance on the circular path 4. The tolerance of the starting point 2 can be, for example, an amount of ±30° on the circular path 4.

It is possible to introduce the hole 1 into the cylinder head first, for which purpose a simple drilling tool can be used. The internal thread can then be introduced with the drilling tool. Here, the hole 1 can be introduced from one side of the cylinder head and the internal thread from the opposite side thereto. It is also possible to introduce both the hole and the internal thread from the same side. Of course, use can also be made of a combination tool which combines a drill and a milling tool, so that a drilling thread milling cutter is formed.

Once the internal thread has been produced, this can be subjected to a check in order to establish whether the spark plug, when mounted, is actually aligned with its spark gap oriented toward the injector. The check can be carried out with a device in the embodiment as a plug gage 7 in accordance with the exemplary configuration according to FIGS. 2 to 4.

The plug gage 7 has a threaded body 8 with a screw-in thread 9, on which, on the one side 10 thereof, which can be designated as screw-in side 10, an extension 11 is arranged. At the end 12 of the screw-in thread 9 opposite to the extension 11 there is arranged a central section 12, which merges into a measuring section 13. Arranged on the measuring section 13 is a hexagon 14 having a spanner flat. The central section 12 is preferably designed cylindrically and has a diameter which is smaller than the diameter of the measuring section 13. The measuring section 13 is preferably designed cylindrically and has a measuring face 15 which is incorporated into the measuring section 13 as a flat face in the manner of a circular section. The measuring face 15 is delimited by material lands 16 that have remained standing. The measuring face 15 is arranged in a predefined position in relation to the extension 11 such that, with the recording of the angular position of the measuring face 15, when the plug gage 7 is screwed in, the position of the extension 11 in relation to the injector can be determined. Of course, the measuring face 15 is arranged in the measuring section 13 such that it is possible to draw conclusions about the position of the extension 11 relative to the measuring face 15. Since the extension 11 simulates the spark plug electrode, that is to say is arranged on the threaded body 8 in the same way as the ground electrode on the relevant spark plug, then conclusions about the position of the ground electrode in the combustion chamber are possible. The plug gage 7 is screwed in by means of action on the hexagon 14, the tightening moment correlating with the spark plug torque that can be applied by means of a torque wrench.

An angle measuring instrument, which records the angular position of the measuring face 15 when the plug gage 7 has been screwed in with the predefined tightening moment, can then be placed on the measuring face. By means of the angular position, the position in the combustion chamber of the extension 11 and thus of the ground electrode of the spark plug that is yet to be screwed in can be detected. The angular position of the measuring face 15 can be recorded manually or by machine.

The invention claimed is:

1. A method for producing and checking a thread arranged in a cylinder head to receive a spark plug having a spark plug thread, comprising at least the following steps:
    determining spark plug parameters,
    introducing a spark plug hole into the cylinder head,
    defining a starting point of an internal thread to be introduced into the spark plug hole and corresponding with the spark plug thread, by using the spark plug parameters determined, introducing the internal thread by a milling tool being brought up to a wall of the hole tangentially at least in an area of the starting point, with the internal thread being milled circularly, and
    introducing a plug gage which has the spark plug parameters, the plug gage having a spanner flat for engaging a torque wrench and a measuring face which is provided opposite an extension arranged on a threaded body corresponding to the spark plug thread, wherein an orientation of the extension in a mounted state can be detected by the measuring face.

2. The method as claimed in claim 1, wherein the spark plug parameters are thread parameters and a predefined tightening moment.

3. The method as claimed in claim 1, wherein, during production of the internal thread, the milling tool is moved along the wall of the hole along a circular path, undergoes a forward thrust and additionally itself rotates about its own central axis, wherein the milling tool is moved up to the starting point tangentially from a central position and, following creation of the internal thread, runs out tangentially.

4. The method as claimed in claim 1, wherein, when the starting point of the internal thread is defined, a tolerance band around the starting point is also defined.

5. The method as claimed in claim 1, wherein an angular position of the measuring face is determined to establish the orientation of the extension.

6. The method as claimed in claim 1, wherein an angular position of the measuring face is recorded manually or by machine.

* * * * *